United States Patent [19]

Canadas

[11] Patent Number: 4,973,020
[45] Date of Patent: Nov. 27, 1990

[54] MIRROR HOUSING FOR A SUNSHADE

[75] Inventor: Jean C. Canadas, Remiremont, France

[73] Assignee: Rockwell-Cim Societe Anonyme, Rupt-sur-Moselle, France

[21] Appl. No.: 334,450

[22] Filed: Apr. 6, 1989

[30] Foreign Application Priority Data

Apr. 6, 1988 [FR] France .................................. 88 04547

[51] Int. Cl.⁵ .............................................. B60J 3/00
[52] U.S. Cl. .................................... 248/467; 296/97.2; 248/206.5; 248/475.1
[58] Field of Search ...................... 248/466, 467, 475.1, 248/206.5; 296/97.5, 97.1, 97.2; 350/631, 604, 606

[56] References Cited

U.S. PATENT DOCUMENTS

| 4,000,404 | 12/1976 | Marcus ........................... 296/97.5 X |
| 4,068,930 | 1/1978 | Marcus ........................... 350/606 X |
| 4,203,149 | 5/1980 | Viertel et al. .................. 296/97.5 X |
| 4,715,644 | 12/1987 | Lobanoff et al. .................. 296/97.5 |
| 4,721,310 | 1/1988 | Gavagan et al. .................... 296/97.5 |

FOREIGN PATENT DOCUMENTS

| 0261989 | 3/1988 | European Pat. Off. ........... 296/97.5 |
| 0014516 | 1/1984 | Japan .................................... 296/97.5 |

Primary Examiner—Karen J. Chotkowski
Attorney, Agent, or Firm—Toren, McGeady & Associates

[57]                ABSTRACT

A mirror housing with a swivelable flap which covers the mirror and is arrestable in an open and a closed position, and a snap-in arrangement including a permanent magnet and a metal piece for securely fastening the flap in the end positions.

8 Claims, 4 Drawing Sheets

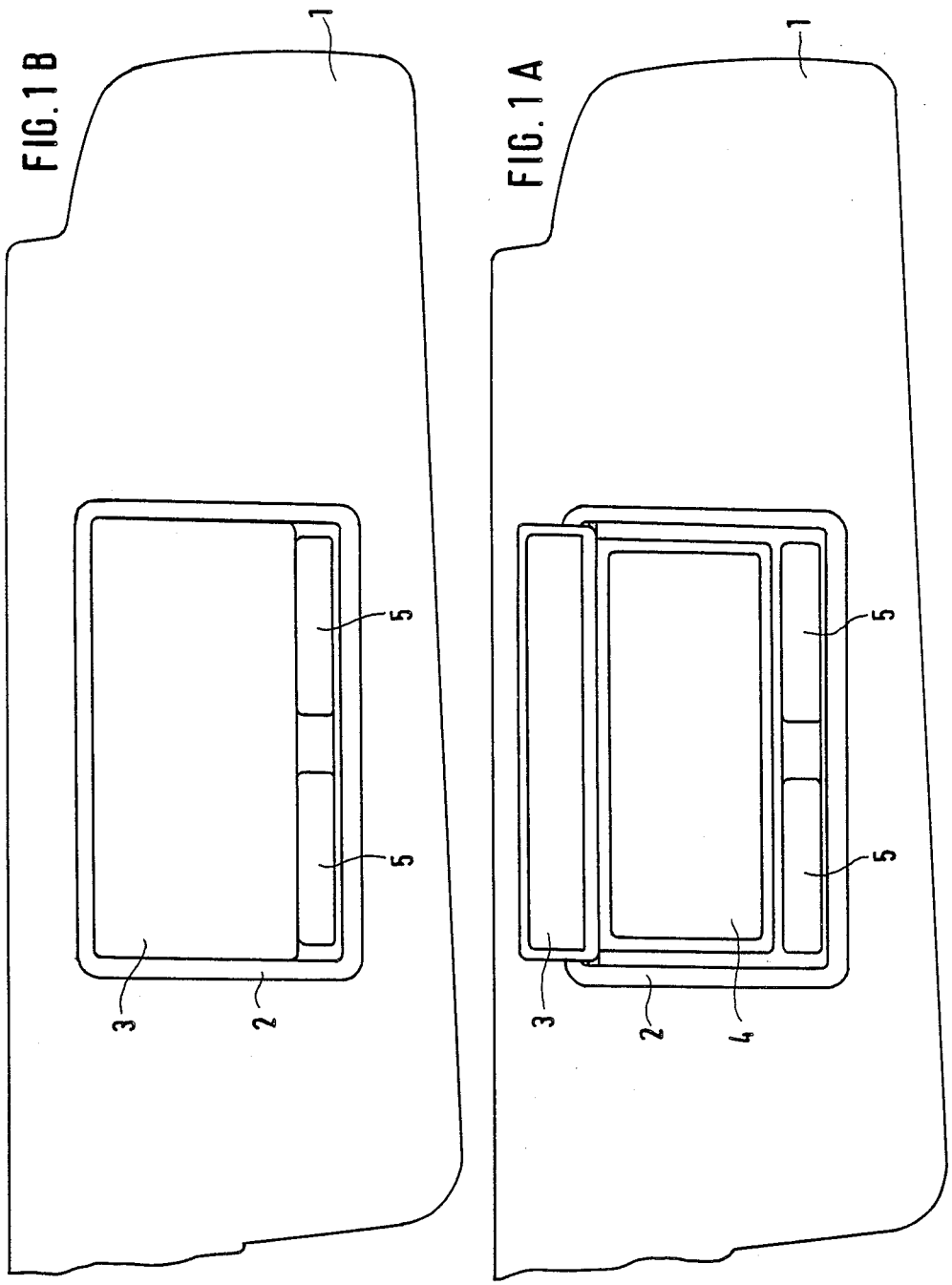

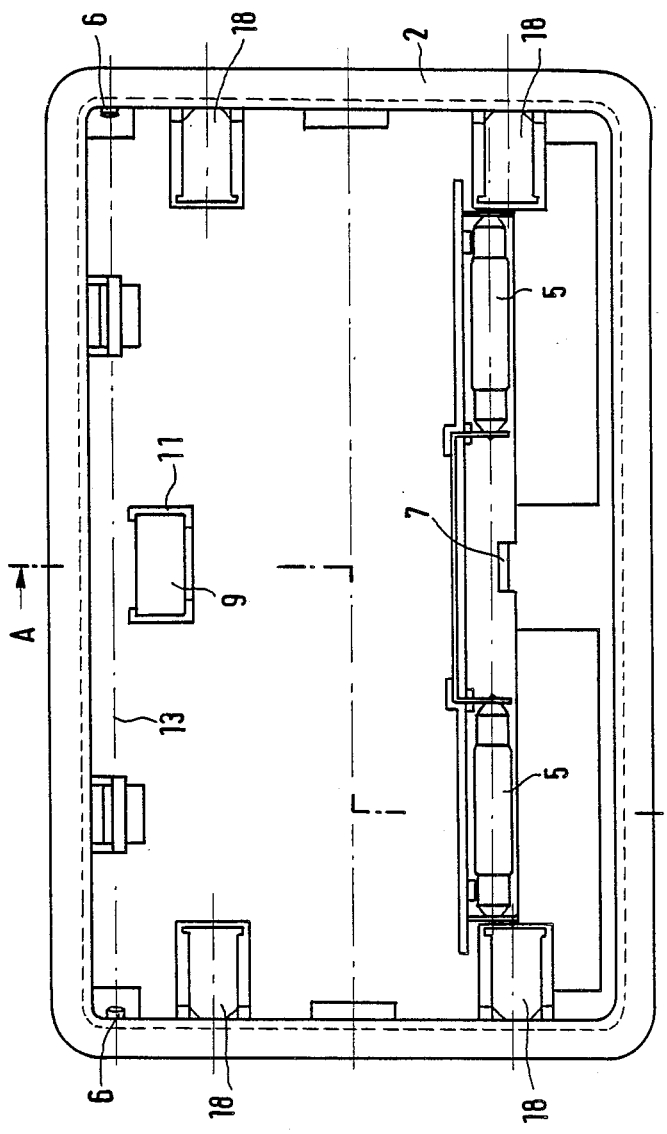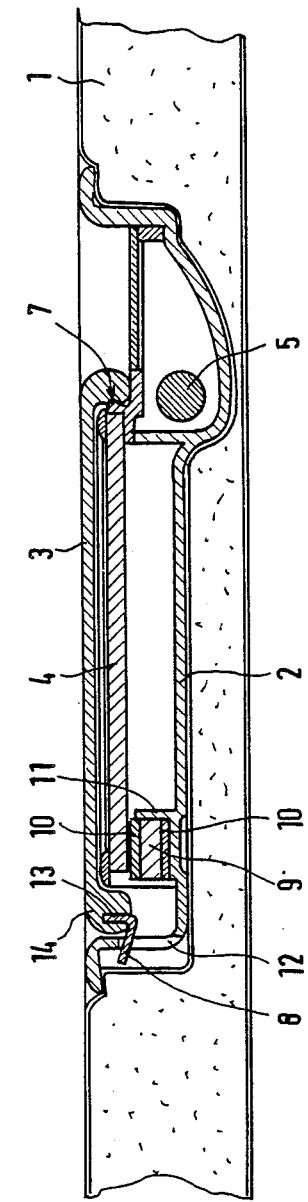

MIRROR HOUSING FOR A SUNSHADE

BACKGROUND OF THE INVENTION

The present invention relates to a mirror housing for a sunshade with a swivelable flap which covers the mirror and is arrestable by a snap-in arrangement in the open and closed position. The snap-in arrangement consists of a stationary snap-in element configured at the mirror housing and a snap-in element moving together with the flap.

A mirror housing is known from DE-OS 37 03 511 in which cooperating cam elements are provided for fixing of a self-cover or flap covering the mirror in the open or closed position. The cam elements are configured concentrically to the swiveling axis of the flap, wherein one cam element is stationary and connected with the frame of the mirror housing. The associated other cam element is configured at the flap and is rotated around the swiveling axis during the swiveling movement of the flap. A pressure spring is provided to maintain the cam elements in tight engagement with each other. A disadvantage of this known mirror is the difficult assembly of the individual parts. The installation of the pressure spring is seen to be particularly difficult and time consuming, this spring having to be preloaded. It is also disadvantageous that when the flap is opened, the force exerted by the spring upon the cam elements must be overcome, which entails a sluggish or stiff operation of the flap during the swiveling operation. In addition, unpleasant snap effects arise in the end positions of the flap.

Another mirror housing with a swivelable flap is known from DE-OS 26 31 712, in which the arresting of the flap in the end positions occurs by means of tension springs. Herein the tension springs engage by means of levers at the flap in the region of the swiveling axis in such a manner that the force exerted by the springs is displaced during swiveling of the flap from one side of the swiveling axis to the opposite side of the axis. This means the arresting of the flap in the end positions occurs by means of the so-called over-dead-center effect.

The large space requirement for the tension spring is especially disadvantageous in this known mirror flap snap-in arrangement. It follows that the mirror housing requires a great installation depth. Apart from that, it has the same disadvantages as the snap-in mechanism known from DE-0S 37 03 511, where the installation of the tension spring was fraught with difficulties and snap effects occur apart from the sluggishness of the flap.

SUMMARY OF THE INVENTION

Accordingly, it is an object of the invention is to provide a mirror housing for a sunshade which requires a small space and is easily installed and can be smoothly swiveled.

Pursuant to this object, and others which will become apparent hereafter, one aspect of the present invention resides in the snap-in mechanism or the snap-in arrangement for arresting the flap in the end positions consisting of a permanent magnet and a ferromagnetic metal piece. In accordance with the invention, the permanent magnet and the metal piece come only in contact with each other when the flap is in one of the end positions. In between these end positions, meaning the open and closed position of the flap, a smooth swiveling of the flap is possible in an expedient way.

For the closed position, the snap-in arrangement in the invention is configured in the region of the front edge of the flap. On the other hand, the snap-in arrangement for the open position is fastened in the region of the swiveling axis of the flap. The attachment of the permanent magnet and the metal piece can be performed in the shortest time by means of pressing or bonding into depressions or mountings provided for receiving the permanent magnet and the metal piece. The assembly is considerably simplified thereby. Also, the snap-in arrangement in the invention needs only very little space within the mirror housing.

According to another embodiment of the invention, the metal piece consists of a leaf spring. The leaf spring has the advantage, compared to a rigid metal piece, that the engagement contact is absorbed in a flexural and dampening manner when the leaf spring arrives into the radius of action of the permanent magnet and the magnetic forces of attraction become effective. Depending on the application, the metal piece or the leaf spring or the permanent magnet can form the stationary or the moving part of the snap-in arrangement in the invention. Also, the snap-in arrangement in the invention can be provided exclusively in the region of the swiveling axis for causing the open position of the flap. For the closed position, the flap can furthermore be provided with a known fastening device, for instance a snap-in projection and a snap-in depression or recess. Furthermore, it is possible to provide several snap-in arrangements according to the invention in order to increase the holding force.

Preferred embodiments of the invention are discussed below in connection with the accompanying drawings.

BRIEF DESCRIPTION OF THE DRAWINGS

FIG. 1A shows a sunshade with a mirror housing pursuant to the present invention, in which the flap has been swiveled open;

FIG. 1B shows a sunshade where the mirror housing is closed by the flap;

FIG. 2 is a detail view of a mirror housing without the mirror inserted;

FIG. 3 is a section through the mirror housing in FIG. 2 along the line A—A;

DETAILED DESCRIPTION OF THE PREFERRED EMBODIMENTS

Figure 4:
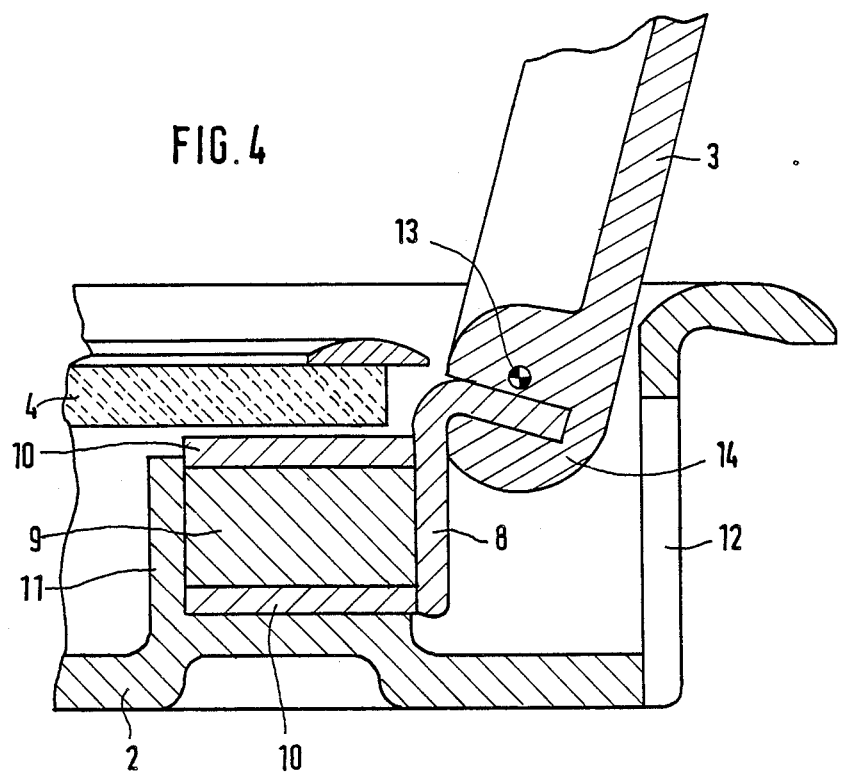
FIG. 4 is a magnified presentation of the swiveling axis region of the mirror housing with the flap in the open position.

FIG. 1A shows a mirror housing 2 inserted in a sunshade 1. A mirror 4 is provided inside the mirror housing 2, which can be covered by a swivelable flap 3. FIG. 1A shows the flap 3 in the open position. In addition, the mirror housing 2 contains lighting arrangements 5, for instance in the form of small lamp bulbs, which are covered by a frosted glass panel. Fig 1B shows the sunshade 1 together with the mirror housing 2, with the flap 3 in a closed position.

FIG. 2 shows the mirror housing 2 without the flap 3 and without the inserted mirror 4. The mirror housing 2 is fastened to the sunshade 1 by pegs 18 which can be pressed in. Two oppositely located bearing points 6 for the flap 3 are configured at the side edges of the mirror housing 2. The two support points 6 thus form a swiveling axis 13 for the flap 3.

The small lamp bulbs for the lighting arrangement 5 can be discerned in the front region of the mirror housing 2 depicted in FIG. 2. Equally, a snap-in connection 7 is provided on the axis of symmetry of the mirror housing 2, which is described below with reference to FIG. 6. A permanent magnet 9 is also inserted, snapped in or bonded in attachments 11, for instance in the form of webs, at the bottom of the mirror housing 2 so as to also lie on the axis of symmetry in the region of the swiveling axis 13. The arrangement of the permanent magnet 9 is selected by way of an example. The permanent magnet 9 can also be arranged sidewise of the axis of symmetry in the region of the swiveling axis 13. In this case it is advantageous to provide two or several permanent magnets 9 in order to increase the holding force, which magnets lie preferably on a line parallel to the swiveling axis 13. According to the embodiment in FIG. 2, the closed position of the flap 3 is defined by the front snap-in connection 7 and the open position by the permanent magnet 9 with an associated metal piece (not pictured in FIG. 2).

FIG. 3 shows a section through the mirror housing 2 in FIG. 2 along the line A—A, wherein the mirror housing 2 is inserted into the sunshade 1 and is equipped with the mirror 4 and the flap 3 in its closed position. The rear edge region of the flap 3 comprises a thickened portion 14 along the swiveling axis 13. A ferromagnetic metal piece 8 is inserted into a recess in this thickened portion 14. The metal piece 8 extends preferably as far over the entire length of the thickened portion 14 along the swiveling axis 13, as is necessary to cover several permanent magnets 9 which are provided. It is however also possible to provide a short metal piece 8 for each permanent magnet 9.

The metal piece 8 must have a magnetic property so as to be attractable to the permanent magnet 9. Preferably the metal piece 8 consists of a leaf spring. In FIG. 3 the free end of the metal piece 8 or of the leaf spring is bent towards the rear, so that the leaf spring 8 has a V-shape cross section. The free end of the bent off leaf spring 8 extends through a passage 12 in the wall of the mirror housing 2. If the flap 3 is opened, the free end of the leaf spring 8 swivels towards the permanent magnet 9 and comes to rest there as is depicted in enlarged detail in FIG. 4. The V-shaped cross section of the leaf spring 8 determines the angle of opening of the flap 3. Apart from that, the V-shaped cross section makes possible a secure fastening of the leaf spring 8 and a simple positioning of the permanent magnet 9. This means the permanent magnet 9 can be fastened so as to be flat on the bottom of the mirror housing 2 in spite of the large angle of opening of the flap 3, wherein in spite of that it is assured that the leaf spring 8 contacts the side face of the permanent magnet 9 in planar manner. Hereby result large holding forces with a very minor space requirement, since the permanent magnet 9 can be positioned very near to the swiveling axis. Apart from that, the selection of the length of the free end of the leaf spring 8 permits the use of permanent magnets 9 of differing thicknesses.

In addition, the V-shaped cross section of the leaf spring 8 causes a spring effect which permits the flap 3 to slightly swivel or oscillate in case of vibrations in the motor vehicle. Since the flap 3 is allowed to slightly swivel, the leaf spring 8 is also not easily pried off the permanent magnet 9, if the vehicle drives, for instance, through a pothole. In the course of the swiveling motions of the flap 3, the leaf spring 8, because of its flexibility and the V-shape, is slightly displaced at the side edge of the permanent magnet 9. Thus it follows that the vibration energy of the flap 3 is converted into friction between the leaf spring 8 and the magnet 9. A metal piece 8 rigidly connected with the flap 3 would therefore be lifted off the permanent magnet 9 much more easily by the vibration forces, wherein additionally a larger space would be required. Apart from that, the V-shape of the leaf spring 8 dampens the contact impact, when the magnetic holding forces between permanent magnet 8 and leaf spring 9 become fully effective.

Figure 5:
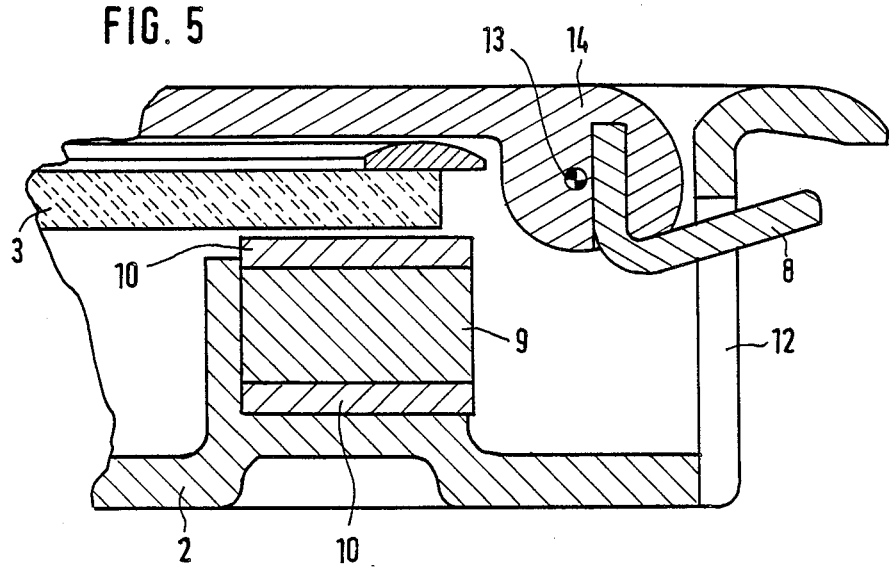
FIG. 5 shows the swiveling axis region in FIG. 4 in the closed position of the flap.

FIG. 5 shows a magnified view of the swiveling axis region in the closed position of the flap 3. Because the free end of the leaf spring 8 projects through the passage 12 in the wall of the mirror housing 2, it is possible to position the wall and the permanent magnet 9 close to the region of the swiveling axis 13. Thus, there results an extremely compact construction. As can be further recognized in FIGS. 3–5, the permanent magnet 9 comprises pole shoes 10 in order to increase the holding force, since the pole shoes 10 in the open position of the flap 3 form a magnetically closed circuit together with the leaf spring 8. In the embodiment shown, the magnetic poles lie at the top and bottom of the pole shoes 10. It can be further discerned from FIGS. 4 and 5, that the flap 3 can be smoothly swiveled between the end positions.

Figure 6:
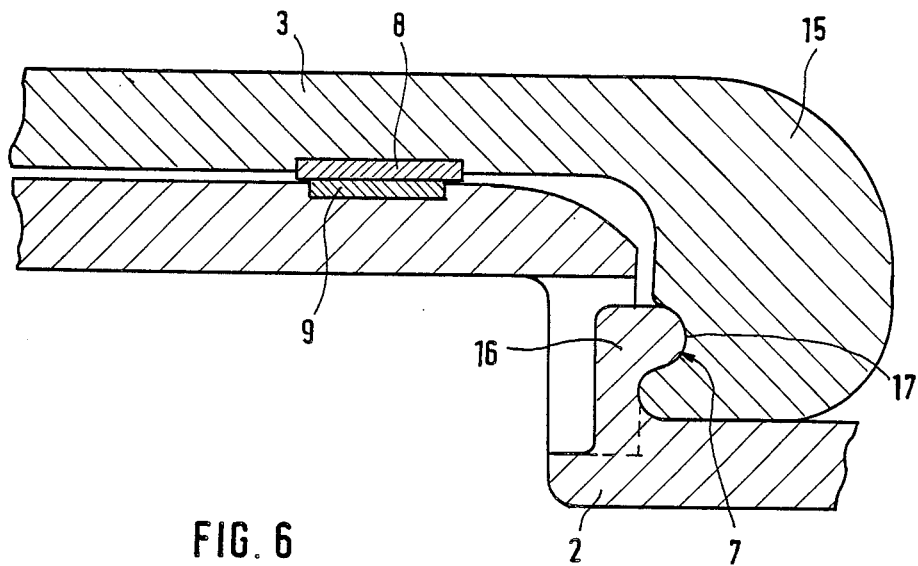
FIG. 6 is a magnified presentation of the front edge region of the flap.

FIG. 6 shows a magnified presentation of the front edge region of the flap 3 with two embodiments causing the closed position. On the one hand, a snap-in connection 7, consisting of a snap-in protrusion and a snap-in depression 17, is provided. The snap-in connection in the front edge region is possible since no large holding forces have to be exerted in the closed position of the flap 3. However, it is also possible to provide a snap-in connection in the front edge region consisting of a metal strip 8 and a permanent magnet 9 in the form of a thin magnetic foil. The metal strip 8 can again be a leaf spring, which for instance is bent in a spherical shape.

While the invention has been illustrated and described as embodied in a mirror housing for a sunshade, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. A mirror housing for a sunshade, comprising: a main body; swivelable flap having a swivel axis and being provided so as to cover a mirror; and snap-in means for arresting the flap in an open and a closed position, the snap-in means including a stationary snap-in element provided on the main body and a movable snap-in element movable together with the flap, the stationary snap-in element being a permanent magnet and the movable snap-in element being a ferromagnetic metal piece, the snap-in elements being located in the region of the swivel axis.

2. A mirror housing according to claim 1, said snap-in means further including a snap-in element consisting of a permanent magnet and a metal piece configured in a region of a front edge of the housing.

3. A mirror housing according to claim 1, wherein the permanent magnet comprises pole shoes.

4. A mirror housing according to the claim 1, wherein the metal piece is a leaf spring.

5. A mirror housing according to claim 4, wherein the leaf spring is curved.

6. A mirror housing according to claim 5, wherein the leaf spring is curved in a V-shape.

7. A mirror housing according to claim 5, wherein the leaf spring is curved in a bracket-shape.

8. A mirror housing according to claim 1, and further comprising means provided at a front edge of the housing for maintaining the flap in the closed position.

* * * * *